United States Patent [19]

Billeter, deceased

[11] Patent Number: 4,564,246
[45] Date of Patent: Jan. 14, 1986

[54] COMBINED RESERVOIR AND PIPE HANGER FOR RAILROAD BRAKES

[75] Inventor: Henry R. Billeter, deceased, late of Marco Island, Fla., by Lucille Billeter, administratrix

[73] Assignee: Sloan Valve Company, Franklin Park, Ill.

[21] Appl. No.: 551,402

[22] Filed: Nov. 14, 1983

[51] Int. Cl.4 .............................................. B60T 11/34
[52] U.S. Cl. .......................................... 303/85; 220/22
[58] Field of Search ........................ 303/1, 86, 85, 56; 220/22

[56] References Cited

U.S. PATENT DOCUMENTS 479,736  7/1892  Farmer ................................... 303/85
1,919,421  7/1933  Carpenter ............................. 303/85

Primary Examiner—Bruce H. Stoner, Jr.
Assistant Examiner—Alvin Oberley
Attorney, Agent, or Firm—Kinzer, Plyer, Dorn & McEachran

[57] ABSTRACT

A combined reservoir tank and pipe bracket for use in a railroad car air brake system includes a tank having a partition therein which divides the tank into emergency and service portions. An emergency valve mounting saddle and emergency valve are attached to the exterior of the tank and connected to the emergency portion of the reservoir. A service valve mounting saddle and service valve are attached to the exterior of the tank and there is a connection therefrom with the service portion of the tank. The mounting saddles are spaced on opposite sides of the tank and there is a tube extending within the tank and connecting the saddles which functions as a pipe bracket quick action chamber. There are conduits connecting the saddles in parallel arrangement with the quick action chamber tube for brake cylinder air, brake pipe air and the emergency reservoir.

5 Claims, 6 Drawing Figures

COMBINED RESERVOIR AND PIPE HANGER FOR RAILROAD BRAKES

SUMMARY OF THE INVENTION

The present invention relates to railroad car air brake systems and in particular to a combined reservoir tank and pipe bracket.

A primary purpose of the invention is a combined reservoir tank and pipe bracket for the environment described which eliminates a substantial amount of external piping in an air brake system.

Another purpose is a structure of the type described which places the pipe bracket filter on the exterior of the structure, thereby permitting easy access.

Another purpose is a simply constructed reliably operable combined reservoir tank and pipe bracket eliminating the conventional connections between the reservoirs and the ABD control valve.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

A typical railroad car air brake system includes an ABDW control valve and the conventional reservoir tank having an emergency portion and a service portion. The brake pipe is connected to the pipe bracket portion of the ABDW control valve, with the pipe bracket forming the interconnection between the emergency portion and the service portion of the ABDW valve. There are external connections from the pipe bracket portion of the ABDW valve to the brake cylinder and retaining valve and internal connections to the emergency reservoir and service reservoir. The present invention combines the reservoir tank having both the emergency and service portions and the pipe bracket. The emergency and service valves normally forming a part of the ABDW valve are mounted upon the reservoir or tank which, combined with the cross connections between and through the reservoir, function as a combination tank and pipe bracket.

Figure 1:
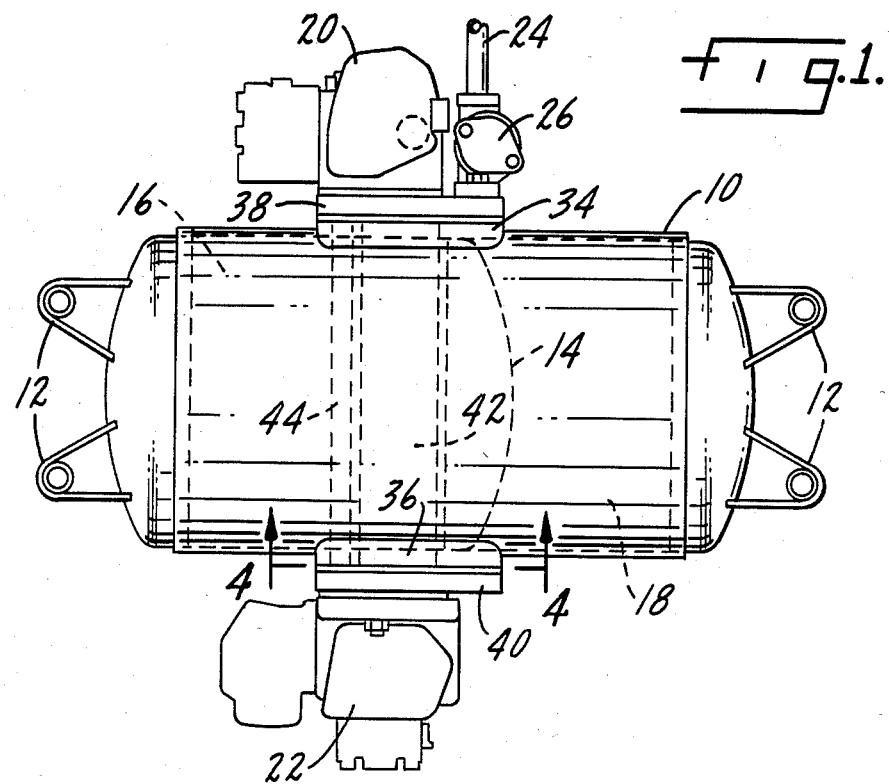
FIG. 1 is a top plan view of a combined reservoir tank and pipe bracket with control valves and a filter mounted thereon.
Figure 2:
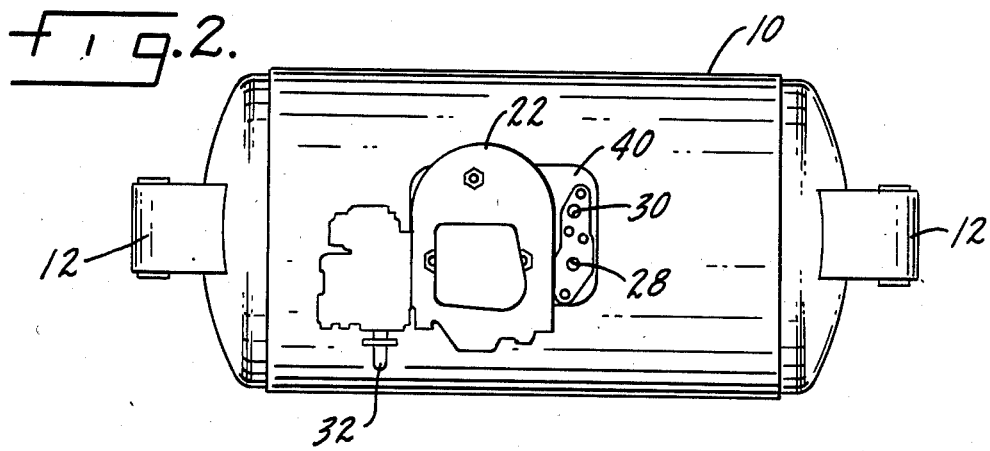
FIG. 2 is a side view of the service portion side of the combination of FIG. 1.
Figure 3:
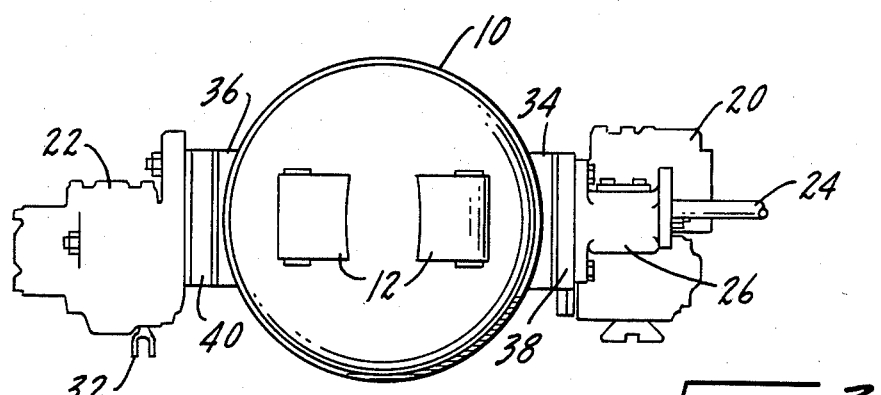
FIG. 3 is an end view of the structure of FIGS. 1 and 2.

A tank or reservoir is indicated at 10 in FIG. 1 and has mounting brackets 12 on opposite ends thereof. The tank is divided into two sections by an interior diaphragm or partition 14, with the emergency portion of the tank being indicated at 16 and the service portion of the tank being indicated at 18. Looking specifically at FIG. 1, the emergency valve portion of the ABDW control valve is indicated at 20 and the service valve portion of the ABDW control valve is indicated at 22. The brake pipe connection to the valve construction illustrated is by pipe 24 which is connected to a filter 26 mounted adjacent to the emergency valve 20. As indicated in FIG. 2, the connection for the brake cylinder pipe is indicated at 28 on the service valve with the connection for the retaining valve being indicated at 30, also on the ABDW service valve portion at 22. A release rod is indicated at 32, with the above-described connections forming the normal connections to the ABDW valve.

Mounted on the exterior of tank 10 is an emergency saddle 34 and a service saddle 36, with saddle 34 forming a part of the mounting structure for emergency valve 20, which structure includes a mounting plate 38 which supports both emergency valve 20 and filter 26. Plate 38 will form the necessary interconnections between the emergency valve and filter and the service valve as described hereinafter.

Figure 4:
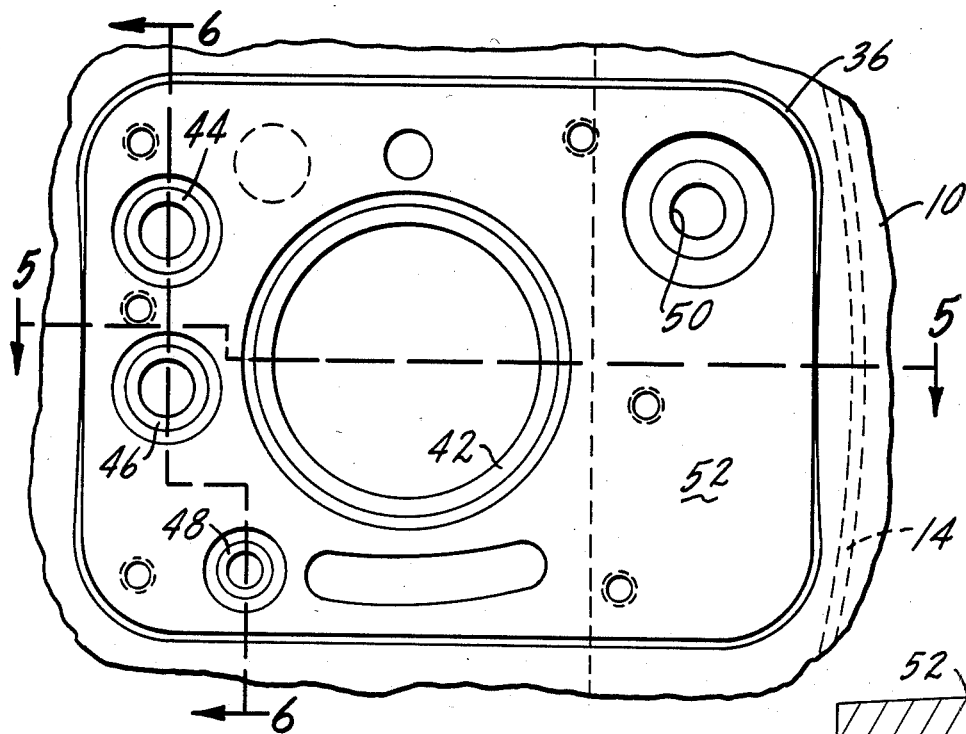
FIG. 4 is an enlarged section along plane 4—4 of FIG. 1.

Service valve mounting plate 36 supports a mounting plate 40 and service valve 22. Looking specifically at FIG. 4, which is a section through the mounting arrangement for the service valve, and there will be a similar mounting arrangement for the emergency valve, there are shown several conduits or tubes which cross over between the mounting saddles 34 and 36, forming connections therebetween. There is a large tube 42 which functions as the pipe bracket quick action chamber, conventional in the pipe bracket portion of the ABD valve. Tube 42 is connected to both saddles 34 and 36 and forms a connection therebetween. A brake pipe connection is formed by conduit 44 and a brake cylinder connection is formed by conduit 46. Both conduits 44 and 46 are connected between saddles 34 and 36 and form the normal cross connections between the emergency and service valves of the ABD control valve. A conduit 48 forms a cross connection between the emergency and service valves for emergency reservoir pressure. Saddle 36 is completed by an opening 50 which is a connection between the saddle and service reservoir 18. In like manner, saddle 34 supporting the emergency valve will have a connection with emergency portion 16 of tank 10.

Figure 5:
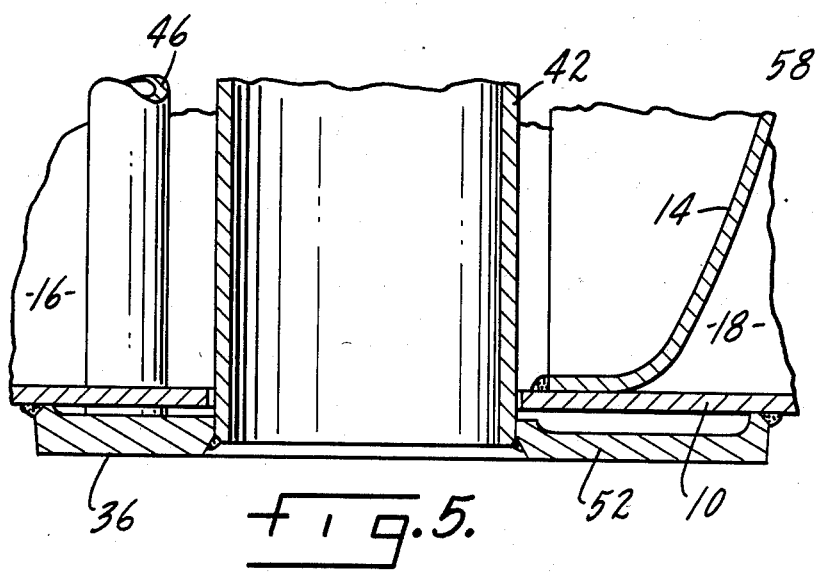
FIG. 5 is a section along plane 5—5 of FIG. 4.
Figure 6:
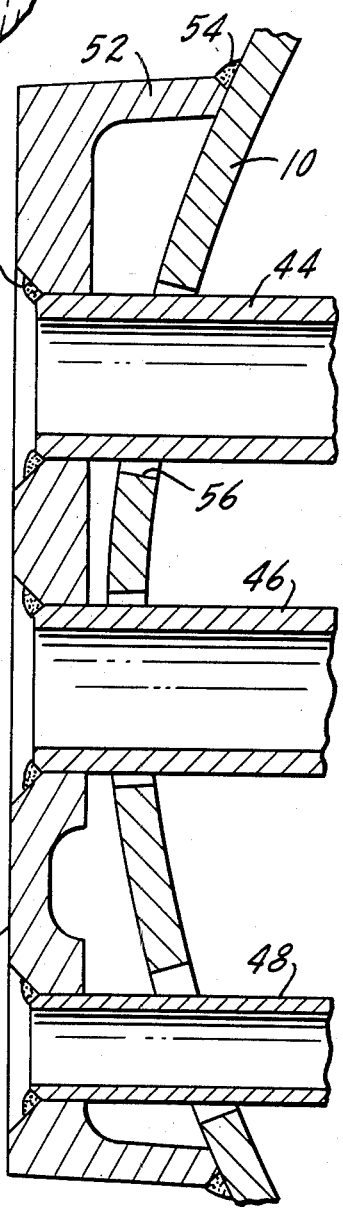
FIG. 6 is an enlarged section along plane 6—6 of FIG. 4.

FIGS. 5 and 6 illustrate the construction details of the saddle. The saddle consists essentially of a plate construction 52 welded to the exterior of the tank, as at 54, with the described conduits passing through openings, such as 56 in the tank exterior and then being welded, as at 58, to the plate construction 52. The saddles thus form rigid strong connections mounted upon the exterior of the reservoir tank with cross connections therebetween forming passages for brake cylinder pressure, brake pipe pressure and emergency reservoir pressure. Each of the saddles will have an opening or connection to the emergency and service reservoirs, respectively. In addition, filter 26 is mounted on the emergency valve supporting structure and forms the connection for the brake pipe to the overall valve construction described. This is particularly advantageous as it makes the filter, customarily a part of the pipe bracket, readily accessible for replacement. In the ABD valve, the valve must be largely disassembled in order to change the air filter. That is not true in the present instance and there is a connection from the brake pipe to the filter, with the filter being mounted exteriorly of the pipe bracket and then a connection from the filter into the emergency valve supporting structure.

Of particular advantage in the present invention is the elimination of the various pipe connections between the reservoir and the ABD valve. Elimination of the pipes is not only cost effective, but eliminates the possibility of pipe damage as well as pipe leakage.

Whereas the preferred form of the invention has been shown and described herein, it should be realized that there may be many modifications, substitutions and alterations thereto.

The embodiments of the invention in which an exclusive property or privilege is claimed are defined as follows:

1. For use in a railroad car air brake system, a combined reservoir tank and pipe bracket including a tank, a partition within said tank dividing it into emergency and service portions, an emergency valve mounting saddle attached to the exterior of said tank and a connection between said emergency saddle and the emergency portion of said tank, a service valve mounting saddle attached to the exterior of said tank, spaced from said emergency saddle and a connection between said service saddle and the service portion of said tank, a tube extending within said tank and connecting said emergency saddle and said service saddle and functioning as a pipe bracket quick action chamber, and a plurality of conduits connecting said saddles and extending within said tanks in spaced relation to said tube, said conduits functioning to provide connections between said saddles for the emergency reservoir, brake pipe air and brake cylinder air.

2. The combined reservoir tank and pipe bracket of claim 1 further characterized by and including an emergency valve mounted on said emergency saddle and a service valve mounted on said service saddle, and a brake pipe connection on said emergency valve and a brake cylinder pipe connection and a retaining valve connection on said service valve.

3. The combined reservoir tank and pipe bracket of claim 2 further characterized by and including a filter mounted on said emergency saddle, with said brake pipe connection being to said filter, and a connection from said filter to said emergency valve.

4. The combined reservoir tank and pipe bracket of claim 1 further characterized in that said tube and conduits are positioned within the emergency portion of said reservoir.

5. The combined reservoir tank and pipe bracket of claim 1 further characterized in that said tube and conduits are generally parallel.

* * * * *